(12) United States Patent
DiMambro

(10) Patent No.: US 7,076,545 B2
(45) Date of Patent: Jul. 11, 2006

(54) LOAD BALANCING THE SERVICING OF RECEIVED PACKETS

(75) Inventor: Francesco R. DiMambro, San Jose, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 888 days.

(21) Appl. No.: 10/210,487

(22) Filed: Jul. 31, 2002

(65) Prior Publication Data

US 2004/0024873 A1  Feb. 5, 2004

(51) Int. Cl.
*G06F 15/173* (2006.01)

(52) U.S. Cl. ............... 709/223; 709/223; 709/225; 709/249; 709/250; 710/52; 710/53; 710/54; 710/55; 710/56; 710/57; 710/58; 710/59; 710/60

(58) Field of Classification Search ............... 709/223, 709/225, 249, 250; 710/52–54, 55–60
See application file for complete search history.

(56) References Cited

U.S. PATENT DOCUMENTS

| | | | |
|---|---|---|---|
| 5,617,537 A * | 4/1997 | Yamada et al. ............... 709/214 |
| 5,870,627 A * | 2/1999 | O'Toole et al. ............... 710/22 |
| 6,212,593 B1 * | 4/2001 | Pham et al. ............... 710/266 |
| 6,324,595 B1 * | 11/2001 | Tsai et al. ............... 710/15 |
| 6,327,615 B1 * | 12/2001 | Kasper ............... 709/213 |
| 6,334,162 B1 * | 12/2001 | Garrett et al. ............... 710/54 |
| 6,581,113 B1 * | 6/2003 | Dwork et al. ............... 710/52 |
| 6,591,304 B1 * | 7/2003 | Sitaraman et al. ............... 709/238 |
| 6,963,946 B1 * | 11/2005 | Dwork et al. ............... 710/310 |

* cited by examiner

*Primary Examiner*—Zarni Maung
*Assistant Examiner*—Van Nguyen
(74) *Attorney, Agent, or Firm*—Park, Vaughan & Fleming LLP

(57) ABSTRACT

A system and method for distributing a portion of the processing of a received packet among a plurality of service threads. When an ISR or similar process retrieves a packet from a communication interface via a receive descriptor ring, it places the packet on one of a plurality of service queues. Each queue has an associated service thread or process that initiates upper layer protocol processing for queued packets. The ISR may select a particular service queue based on the packet's communication flow or connection. Alternatively, the ISR may use a processor identifier provided by the communication interface to select a queue (e.g., in a multi-processor computer system). Or, other information provided by the interface may be used.

36 Claims, 3 Drawing Sheets

LOAD BALANCING THE SERVICING OF RECEIVED PACKETS

BACKGROUND

This invention relates to the field of computer systems. More particularly, a system and methods are provided for distributing a portion of the processing of received packets among a plurality of threads or processes.

In traditional computing systems, a single process or thread handles the receipt of packets from a hardware module (e.g., a NIC or network interface card). This process, which may be an ISR (Interrupt Service Routine) not only retrieves a packet from a receive descriptor ring and replaces a used buffer, but also makes the received packet available for processing by a higher layer protocol (e.g., IP—Internet Protocol, TCP—Transport Control Protocol), or initiates such processing.

Despite the level of resources in the computer system and the rate of packet arrival, only one packet can be serviced or processed at a time by the ISR. For example, even in a computer system equipped with multiple processors and plenty of memory, generally one processor and thread are called to handle, in serial fashion, every packet received from the hardware module. Many packets may await the attention of the ISR while it is handling a previous packet. The delay encountered by these packets may have a deleterious effect upon the processing efficiency of the computer system.

Therefore, a system and method are needed to decrease the amount of time that an ISR must spend handling each packet that it receives.

SUMMARY

In one embodiment of the invention, a system and methods are provided for distributing some of the processing of a received packet among a plurality of service threads. In this embodiment, when an ISR (or similar process) retrieves a packet from a receive ring, it places the packet in one of a plurality of service queues. Each queue has an associated service thread or process that initiates or performs upper layer protocol processing of the packet (e.g., for IP and TCP).

The ISR may select a particular service queue based on the packet's communication flow or connection. Thus, all packets in one flow or connection may traverse the same service queue. As one alternative, in a computer system having multiple processors, the ISR may use a processor identifier provided by the communication interface to select a queue. Or, other information provided by the interface may be used. The number of service queues and threads may, but is not required to, depend upon the number of processors in the system.

DETAILED DESCRIPTION

Figure 1:
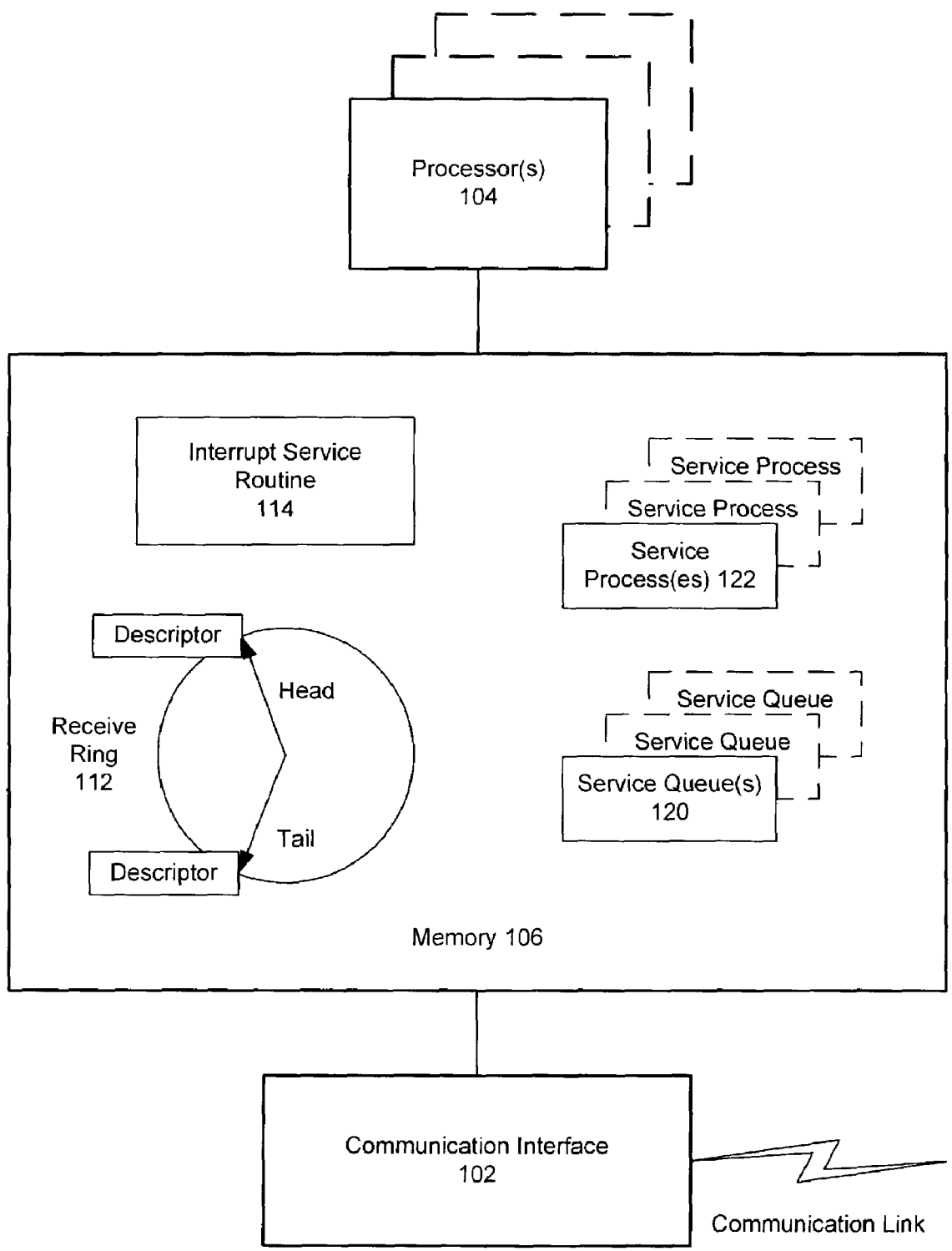
FIG. 1 is a block diagram depicting a computer system in which an embodiment of the present invention may be implemented.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory, and transmission media (e.g., copper wire, coaxial cable, fiber optic media).

In one embodiment of the invention, a system and method are provided for load balancing the processing of received packets. In this embodiment, packets are received at a communication interface of a computer system and placed on a receive descriptor ring. An ISR (Interrupt Service Routine) or similar process (e.g., a polling module) retrieves packets from the ring and replenishes buffers within the ring. The ISR then places the packet in one of a plurality of service queues, which are tended by service threads or processes. A service thread retrieves a packet from a service queue and processes it through one or more communication protocols or submits the packet for such processing.

In particular, in one implementation of this embodiment the service thread successively invokes functions or procedures for processing each protocol of a packet. Thus, a service thread may receive a packet, invoke an IP (Internet Protocol) processing function, then a TCP (Transport Control Protocol) procedure, and so on, to handle each protocol to which the packet conforms. Illustratively, execution returns to the service thread after each protocol-processing function. When one packet is finished, the service thread may attend to the next or, if its service queue is empty, it may block until another packet is received.

Thus, the retrieval of a packet from the receive descriptor ring is decoupled from the subsequent protocol-related processing of the packet. This allows the ISR to finish handling one packet in a shorter period of time, so that it can handle more packets in a given period of time. And, the use of multiple service queues and service threads to perform the subsequent processing of the packets provides greater efficiency during the overall handling of received packets.

For example, by having different service threads operate on different processors of a multi-processor computer system, the protocol processing can be load-balanced and the processing resources of the system can be put to greater use.

In an embodiment of the invention, the ISR distributes or load balances packets among the service queues on the basis of the packets' flows or communication connections. For example, each packet in a single TCP flow may be passed to the same queue. As one alternative, the ISR may select a service queue based on a particular processor that was selected to handle the packet.

In one embodiment of the invention, the communication interface assists the ISR in identifying a service queue for a particular packet. Thus, the interface may configure and pass with the packet a flow identifier for identifying a communication flow, a processor identifier for identifying a particular processor of the computer system (e.g., if it has multiple processors), or some other identifier or characteristic of the packet. The identifier may be used to directly identify a service queue, or may be hashed or otherwise manipulated to obtain a value usable in selecting a queue. For example, the modulo of a flow identifier over the number of queues may be computed.

The number of service queues may, but need not, depend on the number of processors in the system, the amount of system resources (e.g., memory), or some other characteristic of the system. In one embodiment of the invention, one service thread or process is instantiated for each service queue, and only services a single assigned queue. Illustratively, when a service queue is empty, the associated service thread may block. When the ISR places a packet in the queue, the ISR may signal the service thread to awaken it. When a packet is to be placed in a queue, the ISR may just store a pointer (e.g., an mblk) to the packet, rather than the entire packet.

In one alternative embodiment of the invention, service queues may be used to queue things other than packets. For example, a service queue may be populated with pointers to processes, modules or other constructs that require the attention of a processor or other system component.

FIG. 1 depicts a computer system in which an illustrative embodiment of the invention may be implemented. The system of FIG. 1 includes communication interface 102 for receiving packets from a communication link. The communication link may be wired or wireless, and may be dedicated (e.g., point-to-point) or shared (e.g., a network, such as the Internet). The system also includes one or more processors 104 for executing an ISR, a service thread, a device driver for communication interface 102, an operating system, and so on.

Memory 106 includes receive descriptor ring 112, which transfers packets from communication interface 102 to a system processor. ISR 114, which acts in response to an interrupt from the communication interface, reads a descriptor in receive ring 112, accesses a buffer specified in the descriptor, replenishes the ring with a replacement buffer and retrieves a packet from the specified buffer.

Memory 106 may also include a device driver for controlling operation of communication interface 102 and/or an operating system for controlling operation of the computer system (e.g., Solaris® by Sun Microsystems, Inc.)

The ISR stores each packet retrieved from receive ring 112 into one of service queues 120. Each service queue is tended by a corresponding service thread/process 122.

As described above, ISR 114 performs the initial handling of a received packet then passes it to a service queue. The corresponding service thread then facilitates upper-layer protocol processing of the packet.

Figure 2:
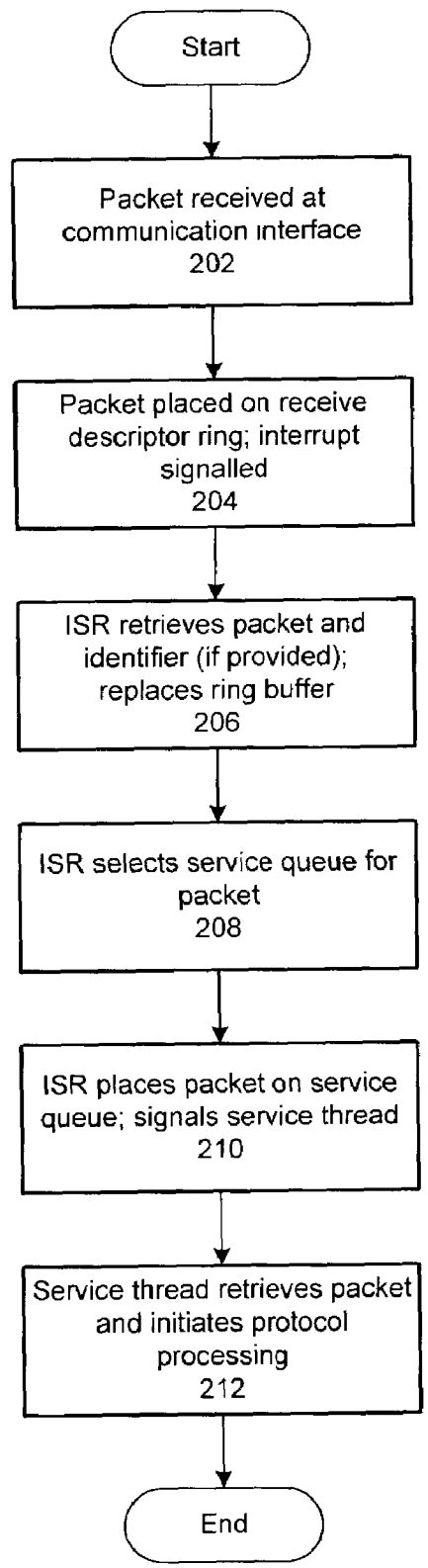
FIG. 2 is a flowchart illustrating one method of load balancing part of the processing of received packets, in accordance with an embodiment of the invention.

FIG. 2 demonstrates one method of receiving a packet and load balancing a portion of packet processing, according to one embodiment of the invention.

In operation 202, a packet is received at a communication interface (e.g., a NIC or Network Interface Card). Illustratively, the packet is formatted according to IP and TCP, and possibly one or more additional upper layer protocols.

In operation 204, the packet is placed on a receive descriptor ring. Illustratively, the packet is stored in a memory buffer and a ring descriptor is configured to identify the buffer. The descriptor may also be configured with other information regarding the packet. For example, within the descriptor, the length of the packet may be indicated, a timestamp may be included, a communication flow or connection of the packet may be identified, a processor identifier may be provided to indicate which processor should handle a packet, etc. After the descriptor is configured, the communication interface may signal an interrupt to alert a host processor to the availability of a packet. In another embodiment of the invention the communication interface may be polled to determine when a packet is available.

In operation 206, an ISR or other thread, process or module for receiving a packet is awoken or executed. The ISR retrieves the packet and any additional information from the ring descriptor that may be useful. The ISR then replenishes the ring by replacing the used buffer with an empty buffer.

In operation 208, the ISR selects one of a plurality of service queues for the packet. As described previously, the selection may be made with the intention of sending all packets of a particular flow or connection through the same queue.

In other embodiments of the invention, packets may be distributed or load balanced among the service queues randomly or via round-robin or other fashion. A processor identifier, flow identifier, protocol identifier or other identifier (which may be received from the communication interface) may be used to assist the selection of a queue.

In operation 210, the ISR or other process that retrieved the packet from the receive ring places the packet on the selected service queue. The ISR may also signal a service thread or process associated with the selected queue. Illustratively, management of the various service threads may be handled by an operating system scheduler executed by a host processor.

In operation 212, the service thread associated with the selected service queue becomes active, retrieves the packet and initiates processing of the packet through IP, TCP and/or other communication protocols of the packet's protocol stack. In this embodiment, while the service thread is initiating the protocol processing, the ISR can be handling the next packet forwarded from the communication interface. And further, multiple service threads may be tending to different packets while the ISR is receiving yet another packet. After operation 212, the illustrated method ends.

Figure 3:
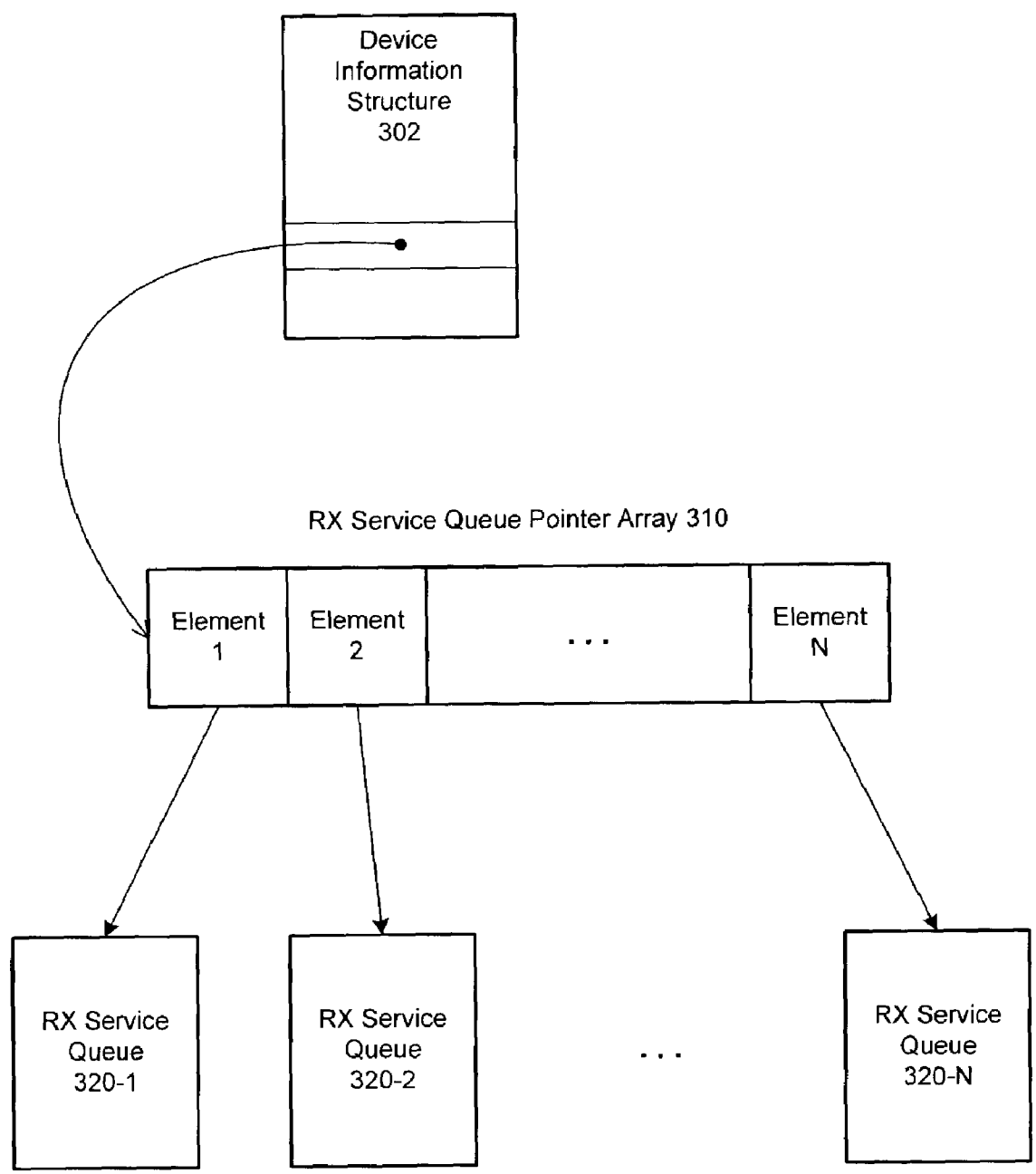
FIG. 3 is a block diagram demonstrating the use of multiple receive service queues for load balancing the processing of received packets, according to one embodiment of the invention.

FIG. 3 depicts a structure for managing and accessing multiple receive service queues, according to one embodiment of the invention. In FIG. 3, device information structure 302 is maintained by a device driver for a communication interface, and may store various status and configuration information regarding the interface.

Device information structure 302 includes a pointer to RX service queue pointer array 310, which contains an element or cell for each service queue established for handling communication (e.g., packets) received from the communication interface.

Each separate RX service queue 320 is instantiated and accessed through RX service queue pointer array 310. Thus, in FIG. 3, N service queues are created. As shown in FIG. 3, management of each service queue can be performed independently of the other queues. As a result, when communications are being placed into or processed within different queues, neither will interfere with the other.

In an embodiment of the invention, an initialization function for creating the service queues is invoked during initialization of the communication interface's device driver. Illustratively, the initialization function allocates and initializes an individual service queue and therefore may be called once for each service queue to be instantiated.

Another function for tearing down a service queue may be invoked during removal or reconfiguration of the device driver. This function would reverse the allocation memory and other steps taken during initialization of a queue.

In one embodiment of the invention, a service queue is implemented as an abstract data structure, and is accompanied by associated functions for manipulating the data structure. In one implementation of this embodiment, the structure of a service queue may be similar to the following:

```
typedef struct_srv_fifo
{   kmutex fifo_lock        (a lock to restrict access to queue)
    kcondvar fifo_cv        (condition variable for thread control)
    size fifo_size;         (size of the service queue)
    uint max_index;         (index for wrapping the queue)
    uint rd_index;          (index for reading from the queue)
    uint wr_index;          (index for putting items into the queue)
    uint pending;           (items in queue awaiting service)
    p_fifo_obj fifo_obi;    (memory reserved for queued items)
    kthread *fifo_thread    (kernel thread handle)
    void (*drain_func) (caddr drain_func_arg);
                            (kernel thread function)
    caddr drain_func_arg;   (arguments for initiating service thread)
    boolean running;        (status of thread)
} srv_fifo, *p srv_fifo;
```

The following illustrative functions may be used to instantiate and destroy a service queue, respectively:

```
int srv_fifo_create(p_srv_fifo, fifo_size, void
  (*drain_thread)( ), caddr);
void srv_fifo_destroy(p_srv_fifo);
```

The "create" function creates a service queue identified by the pointer p_srv_fifo (e.g., in RX service queue pointer array 310 of FIG. 3), of size fifo_size, and identifies the corresponding service thread and the argument used during instantiation of the thread. The "create" function may also be responsible for creating a service thread to service the queue.

The following illustrative functions initiate and terminate a service thread assigned to a service queue, respectively:

```
caddr srv_fifo_begin(p_srv_fifo);
void srv_fifo_end(p_srv_fifo);
```

These functions require only the handle of the corresponding service thread.

The following put function may be employed to place objects (e.g., packets, mblks) into a service queue. This "put" function takes as arguments the service queue handle, the object to be queued as arguments, and an indication of whether or not the service thread should be invoked. The function returns a success or failure indication depending on whether the object was successfully queued. Illustratively, the operation may fail if the queue is full or is in the process of being destroyed.

```
int put_fifo(p_srv_fifo, fifo_obj, boolean);
```

The function may be configured to invoke a service thread for every object placed in the queue, or with some other frequency (e.g., every other object, every x milliseconds that the queue is not empty, when explicitly directed). For example, after one or more communications are placed in a service queue, the put function may be called again just to invoke the service thread without placing an object in the queue.

A corresponding "get" function, to remove an object from the queue (e.g., by a service thread), may be similar to the following:

```
int get_fifo(p_srv_fifo, p_fifo_obj);
```

This function is called with the service queue handle and a pointer to the object. The function will block if there are no objects to retrieve, and will fail if the queue is in the process of being destroyed.

In an embodiment of the invention, service thread may operate according to code similar to the following function:

```
static void drain_fifo(p_srv_fifo handle);
{
    p_ce cep;
    p_mblk mp;
    cep = (p_ce_t)_srv_fifo_begin(handle);
    DEBUG_MSG((cep, RX_CTL, "→ drain_fifo"));
    while (_get_fifo(handle, (p_fifo_obj)&mp) == SUCCESS)
    {
        DEBUG_MSG((cep, RX_CTL, "mp = 0x%X", mp));
        rw_enter(&cep->str_list_rxlock RW_READER);
        ce_send_up(cep, mp, FALSE);
        rw_exit(&cep->str_list_rxlock);
    }
    DEBUG_MSG((cep, RX_CTL "← drain_fifo"));
    srv_fifo_end(handle);
}
```

In this illustrative code, the while loop keeps the service thread alive, from the time the service queue is created, until it is destroyed.

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

What is claimed is:

1. A method of load balancing the processing of packets received at a computer system, comprising:

maintaining a plurality of queues, wherein each said queue is serviced by a separate service process configured to facilitate the processing of a packet in accordance with one or more communication protocols;

receiving packets at a communication interface of a computer system, wherein the communication interface is configured to place the packets onto a descriptor ring; and executing a single interrupt service routine configured to:
receive the packets from the descriptor ring;

replace descriptor ring buffers in which the packets were received;
distribute the packets among the queues; and
signal the service process associated with each queue into which a packet was distributed.

2. The method of claim 1, further comprising:
executing a first service process associated with a first queue to:
retrieve a first packet from the first queue; and
initiate processing of the first packet in accordance with a communication protocol according to which the first packet was formatted.

3. The method of claim 2, wherein said executing a first service process associated with a first queue is performed during the same time said executing a single interrupt service routine is performed.

4. The method of claim 2, wherein the communication protocol is one of IP (Internet Protocol) and TCP (Transport Control Protocol).

5. The method of claim 1, wherein:
the computer system comprises multiple processors; and
each of the multiple processors is configured to execute one or more of the service processes.

6. The method of claim 1, further comprising:
for each packet, receiving a corresponding flow identifier from the communication interface;
wherein the flow identifier is configured to identify a communication flow comprising the packet; and
wherein said distributing the packets comprises selecting a queue associated with the flow identifier.

7. The method of claim 6, wherein said selecting a queue comprises hashing the flow identifier and using the resulting hash to identify a queue.

8. The method of claim 6, wherein said selecting a queue comprises computing a modulo of the flow identifier over the number of queues.

9. The method of claim 1, further comprising:
for each packet, receiving a corresponding processor identifier from the communication interface;
wherein the processor identifier is configured to identify a processor of the computer system; and
wherein said distributing the packets comprises selecting a queue associated with the processor identifier.

10. A computer readable storage medium storing instructions that, when executed by a computer, cause the computer to perform a method of load balancing the processing of packets received at a computer system, the method comprising:
maintaining a plurality of queues, wherein each said queue is serviced by a separate service process configured to facilitate the processing of a packet in accordance with one or more communication protocols;
receiving packets at a communication interface of a computer system, wherein the communication interface is configured to place the packets onto a descriptor ring; and
executing a single interrupt service routine configured to:
receive the packets from the descriptor ring;
replace descriptor ring buffers in which the packet were received;
distribute the packets among the queues; and
signal the service process associated with each queue into which a packet was distributed.

11. A method of processing a received packet, comprising:
receiving a first packet at a communication interface of a multi-processor computer system;
executing an interrupt service routine to:
retrieve the first packet from a receive descriptor ring buffer;
replace the receive descriptor ring buffer;
place the first packet onto one of a plurality of service queues; and
signal a first service process associated with the selected service queue; and
executing said first service process to:
retrieve the first packet from the service queue; and
facilitate processing of the first packet through an upper layer communication protocol.

12. The method of claim 11, further comprising:
receiving a second packet at the communication interface;
executing the interrupt service routine to:
retrieve the second packet from the receive descriptor ring buffer;
place the second packet into a second service queue; and
signal a second service process associated with the second service queue; and
executing said second service process to facilitate processing of the second packet.

13. The method of claim 12, wherein:
the interrupt service routine retrieves the second packet from the receive descriptor ring at the same time the service process facilitates processing of the first packet through an upper layer communication protocol.

14. The method of claim 12, wherein:
said executing said second service process occurs during the same time said executing said first service process occurs.

15. The method of claim 11, wherein the number of service queues is proportional to the number of processors in the computer system.

16. The method of claim 11, wherein the number of service processes equals the number of service queues, and each service process is configured to retrieve packets from only one service queue.

17. The method of claim 11, wherein said placing the packet onto one of a plurality of service queues comprises:
receiving from the communication interface a processor identifier configured to identify one of the multiple processors; and
identifying a service queue associated with said processor identifier.

18. The method of claim 11, wherein said placing the packet onto one of a plurality of service queues comprises:
receiving from the communication interface a flow identifier configured to identify a communication flow comprising the packet; and
identifying a service queue associated with said flow identifier.

19. The method of claim 18, wherein said identifying a service queue comprises computing a hash of said flow identifier.

20. The method of claim 18, wherein said identifying a service queue comprises computing a modulo of said flow identifier over the number of service queues.

21. The method of claim 11, wherein said signalling a service process associated with the selected service queue comprises:
waking the service process.

22. The method of claim 11, wherein said facilitating processing of the packet through an upper layer communication protocol comprises:

processing the packet in accordance with a communication protocol according to which the packet was formatted.

23. The method of claim 22, wherein the communication protocol is one of IP (Internet Protocol) and TCP (Transport Control Protocol).

24. The method of claim 11, wherein said facilitating processing of the packet through an upper layer communication protocol comprises:
submitting the packet to be processed in accordance with a communication protocol according to which the packet was formatted.

25. A computer readable storage medium storing instructions that, when executed by a computer, cause the computer to perform a method of processing a received packet, the method comprising:
receiving a first packet at a communication interface of a multi-processor computer system;
executing an interrupt service routine to:
retrieve the first packet from a receive descriptor ring buffer;
replace the buffer;
place the first packet onto one of a plurality of service queues; and
signal a first service process associated with the selected service queue; and
executing said first service process to:
retrieve the first packet from the service queue; and
facilitate processing of the first packet through an upper layer communication protocol.

26. A computer system, comprising:
multiple processors;
a communication interface configured to receive a packet from a communication link;
a plurality of service queues;
an interrupt process configured to:
receive the packet from the communication interface;
select a first service queue from the plurality of service queues; and
place the packet into the first service queue; and
a first service process, distinct from the interrupt process, wherein said first service process is configured to remove the packet from the first service queue and initiate processing of the packet through one or more communication protocols.

27. The computer system of claim 26, wherein the number of service queues is equal to the number of processors.

28. The computer system of claim 26, wherein the number of service queues is proportional to the number of processors.

29. The computer system of claim 26, further comprising a plurality of service processes, including the first service process;
wherein the number of service processes is equal to the number of service queues.

30. The computer system of claim 26, further comprising:
a receive descriptor ring;
wherein the communication interface is configured to place the received packet onto the receive descriptor ring; and
the interrupt process is configured to retrieve the packet from the receive descriptor ring in response to an interrupt from the communication interface.

31. The computer system of claim 26, wherein the interrupt process selects one of the service queues by:
receiving an identifier from the communication interface; and
identifying a service queue associated with the identifier.

32. The computer system of claim 26, wherein the interrupt process selects one of the service queues by:
receiving from the communication interface, with the packet, a flow identifier configured to identify a communication flow comprising the packet; and
identifying a service queue associated with the flow identifier.

33. The computer system of claim 32, wherein said identifying comprises hashing the flow identifier.

34. The computer system of claim 32, wherein said identifying comprises calculating the modulo of the flow identifier over the number of service queues.

35. The computer system of claim 26, wherein the interrupt process selects one of the service queues by:
receiving from the communication interface, with the packet, a processor identifier configured to identify one of the multiple processors; and
identifying a service queue associated with the processor identifier.

36. The computer system of claim 26, wherein:
said first service process associated with said first service queue is configured to block when said first service queue is empty;
the interrupt process is configured to signal said first service process when the first packet is placed onto said first service queue; and
in response to said signal, said first service process awakes and removes the first packet from said first service queue.

* * * * *